(12) United States Patent
Lin

(10) Patent No.: US 9,776,547 B2
(45) Date of Patent: Oct. 3, 2017

(54) HEIGHT ADJUSTABLE LOADING RAMP

(71) Applicant: Bin Lin, Shanghai (CN)

(72) Inventor: Bin Lin, Shanghai (CN)

(73) Assignee: Shanghai Cartec Industrial and Trading Co., LTD, Shanghai (CN)

( * ) Notice: Subject to any disclaimer, the term of this patent is extended or adjusted under 35 U.S.C. 154(b) by 365 days.

(21) Appl. No.: 13/665,847

(22) Filed: Oct. 31, 2012

(65) Prior Publication Data

US 2016/0347227 A1     Dec. 1, 2016

(51) Int. Cl.
| | | |
|---|---|---|
| *B60P 1/43* | (2006.01) | |
| *E04F 11/00* | (2006.01) | |
| *B65G 69/28* | (2006.01) | |
| *B65G 69/30* | (2006.01) | |
| *B66F 7/24* | (2006.01) | |

(52) U.S. Cl.
CPC ............ *B60P 1/436* (2013.01); *B60P 1/435* (2013.01); *B65G 69/28* (2013.01); *B65G 69/30* (2013.01); *B66F 7/243* (2013.01); *E04F 2011/005* (2013.01); *E04F 2011/007* (2013.01)

(58) Field of Classification Search
CPC .......... B60P 1/435; B60P 1/436; B65G 69/30; B65G 69/28; B65G 1/04; E04F 11/002; E04F 11/06; E04F 11/062; E04F 11/1041; E04F 2011/005; E04F 2011/007; B66F 7/243
See application file for complete search history.

(56) References Cited

U.S. PATENT DOCUMENTS

| | | | | |
|---|---|---|---|---|
| 903,157 | A * | 11/1908 | Allen ..................... | A01K 1/035 119/847 |
| 1,521,450 | A * | 12/1924 | Liedberg ................. | B66F 7/025 187/210 |
| 1,521,990 | A * | 1/1925 | Beynon .................... | B66F 7/14 187/207 |
| 2,232,903 | A * | 2/1941 | Day ........................ | B66F 7/243 254/88 |
| 2,449,829 | A * | 9/1948 | Agren .................... | B65G 69/30 14/69.5 |
| 3,915,430 | A * | 10/1975 | Chromy ................. | B66F 7/243 254/88 |
| 4,718,519 | A * | 1/1988 | Barker ..................... | B66F 3/22 187/211 |
| D298,978 | S * | 12/1988 | Van Buskirk ................. | D34/32 |

(Continued)

*Primary Examiner* — Abigail A Risic

(57) ABSTRACT

A height adjustable loading ramp installed at a tail of a car, for loading or unloading goods, includes: a slope plane and a supporter. The two ends of the slope plane are respectively supported on the ground and the supporter. The supporter includes: two supporting legs adjustable in length, a beam horizontally provided between lower portions of the two supporting legs, wheels for making the loading ramp move conveniently, and a scissor jack for adjusting the height. The scissor jack includes: four scissor jack arms equal in length, and an adjusting-locking device for adjusting and locking the height of the height adjustable loading ramp. In addition, the supporting leg comprises an auxiliary fixing unit for fixing the relative position between the upper and the lower supporting legs and providing an extra security protection, in such a manner that the height of the height adjustable loading ramp is locked.

5 Claims, 6 Drawing Sheets

(56) References Cited

U.S. PATENT DOCUMENTS

| | | | | |
|---|---|---|---|---|
| 5,503,368 A * | 4/1996 | Torres | B66F 7/0608 | 254/122 |
| 5,829,947 A * | 11/1998 | Litten | B60P 1/43 | 14/71.3 |
| 5,855,359 A * | 1/1999 | Chipperfield | B66F 7/0608 | 254/122 |
| 6,045,122 A * | 4/2000 | Torres | B66F 7/0608 | 254/122 |
| 6,484,343 B1 * | 11/2002 | Phillips | B65G 69/30 | 14/69.5 |
| 2009/0307853 A1 * | 12/2009 | Setzer, Jr. | B65G 69/30 | 14/72.5 |
| 2012/0009050 A1 * | 1/2012 | Pepin | B60P 1/435 | 414/537 |
| 2012/0237331 A1 * | 9/2012 | Gabrielson | E01D 15/24 | 414/800 |
| 2013/0193392 A1 * | 8/2013 | McGinn | B66F 7/243 | 254/93 R |
| 2015/0128360 A1 * | 5/2015 | Leum | B65G 69/287 | 14/72.5 |

* cited by examiner

Fig. 4A
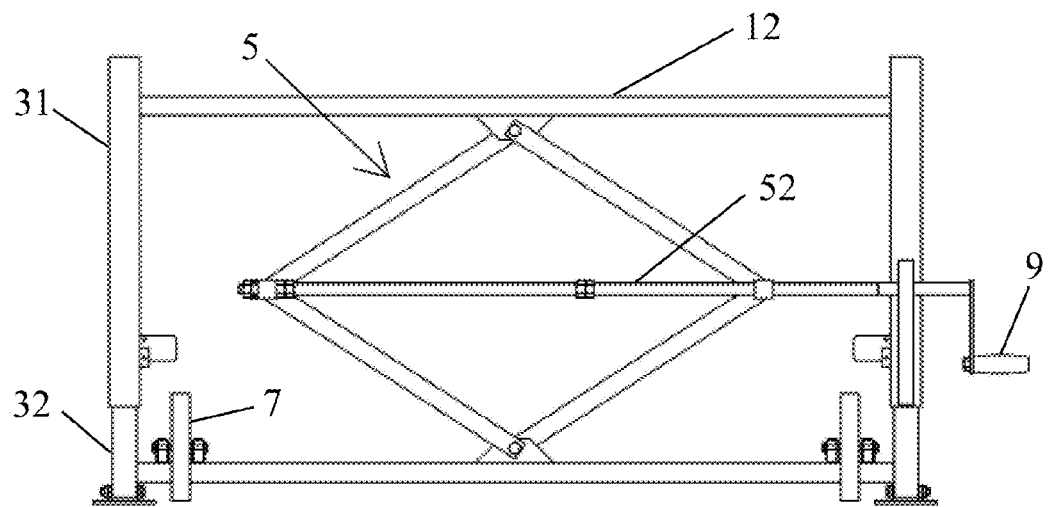
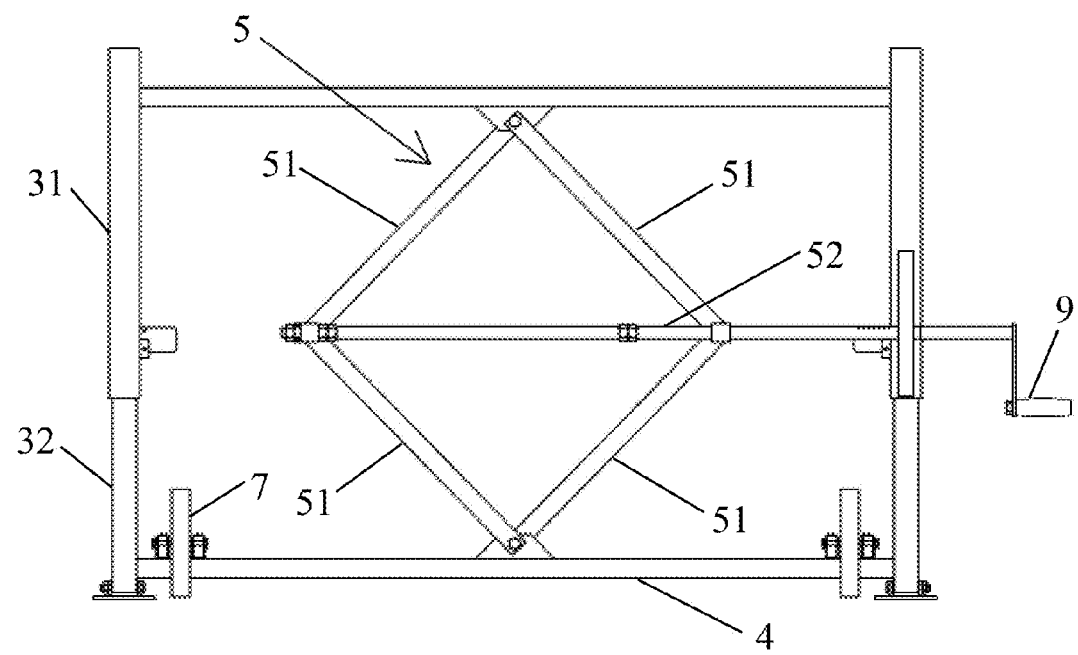
Fig. 4B

HEIGHT ADJUSTABLE LOADING RAMP

BACKGROUND OF THE PRESENT INVENTION

Field of Invention

The present invention relates to a loading ramp, and more particularly to a height adjustable loading ramp installed at a tail of a car or other proper places for loading or unloading goods, the height of which is able to be adjusted.

Description of Related Arts

A loading ramp is usually used at a tail of a car or other places with steps for loading or uploading goods. A traditional loading ramp usually has a simple structure, which only consists of a pair of shelves. Thus, the traditional loading ramp has disadvantages of structural instability, lacking security and narrow application range. In addition, it is difficult to move the traditional loading ramp, which causes much inconvenience to transportation and carrying.

SUMMARY OF THE PRESENT INVENTION

An object of the present invention is to provide a loading ramp with a support frame, thus, comparing with a traditional loading ramp, the loading ramp has a larger application range and a better load-bearing performance and stability when using.

Another object of the present invention is to provide a height adjustable loading ramp. A lifting driving mechanism and an auxiliary fixing mechanism are combined to support the height adjustable loading ramp, in such a manner that an application range of the height adjustable loading ramp is widened. The height of the loading ramp is able to be adjusted according to different situations.

Another object of the present invention is to provide a height adjustable loading ramp which is able be disassembled conveniently. A part of the present invention is able to be disassembled. The height adjustable loading ramp is able to be disassembled and folded when not in use, in such a manner that a space the loading ramp occupied is greatly reduced.

Another object of the present invention is to provide a height adjustable loading ramp which is able to be moved conveniently. The height adjustable loading ramp according to the present invention comprises a plurality of wheels provided at a bottom thereof, in such a manner that the height adjustable loading ramp is able to be moved conveniently.

Accordingly, in order to accomplish the above objects, the present invention provides a height adjustable loading ramp installed at a tail of a car for loading or unloading goods, which comprises:

a slope plane, having a first supporting edge and a second supporting edge, wherein the first supporting edge is supported on the ground;

a supporter, having an upper end supporting the second support edge of the slope plane, in such a manner that an angle is created between the slope plane and the ground to form a slope, wherein the supporter comprises:

two supporting legs, having upper ends connected with the second supporting edges of the slope respectively, wherein each of the supporting legs comprises: an upper supporting leg, and a lower supporting leg, the upper supporting leg and the lower supporting leg are connected movably, a beam, provided horizontally and connected between lower portions of the two supporting legs, two connecting rods, respectively connected between the slope and the corresponding supporting leg to form two triangle supporting structures, a lifting driving mechanism, for example, a scissor jack device, comprising: scissor jack arms, a screw rod, and a driving handle. The four scissor jack arms are in a same vertical plane, and are pivotally connected end-to-end in turn. The four scissor jack arms define a rhomb having invariable sides, and variable interior angles, and having an upper endpoint, a lower endpoint, a left endpoint, and a right endpoint. The four scissor jack arms equal in length are able to be changed by the driving handle to change a distance between the upper endpoint and the lower endpoint, in such a manner that a height of the height adjustable loading ramp is able to be increased or decreased. When in a locking state, relative positions of the left endpoint and the right endpoint on the scissor jack rod are locked, in such a manner that the slope plane is supported by the scissor jack, and the height of the height adjustable loading ramp is locked, and an auxiliary fixing unit, installed on the upper supporting leg for automatically locking a relative position between the upper supporting leg and the lower supporting leg, when increasing the height of the height adjustable loading ramp, the auxiliary fixing unit adds extra security support to the height adjustable loading ramp; and a plurality of wheel units, installed at the bottom of the height adjustable loading ramp or other proper positions for moving the height adjustable loading ramp conveniently.

The height adjustable loading ramp according to a preferred embodiment of the present invention is adjustable in height, large in application range, stable in structure, good in load-bearing performance, and convenient to move; when not in use, the height adjustable loading ramp is able to be disassembled and folded conveniently, in such a manner that the space the loading ramp occupied is greatly reduced.

These and other objectives, features, and advantages of the present invention will become apparent from the following detailed description, the accompanying drawings, and the appended claims.

BRIEF DESCRIPTION OF THE DRAWINGS

FIG. 4A is a structure sketch view of a scissor jack in a descending state according to the preferred embodiment of the present invention.

FIG. 4B is a structure sketch view of the scissor jack in an ascending state according to the preferred embodiment of the present invention.

DETAILED DESCRIPTION OF THE PREFERRED EMBODIMENT

Figure 1:
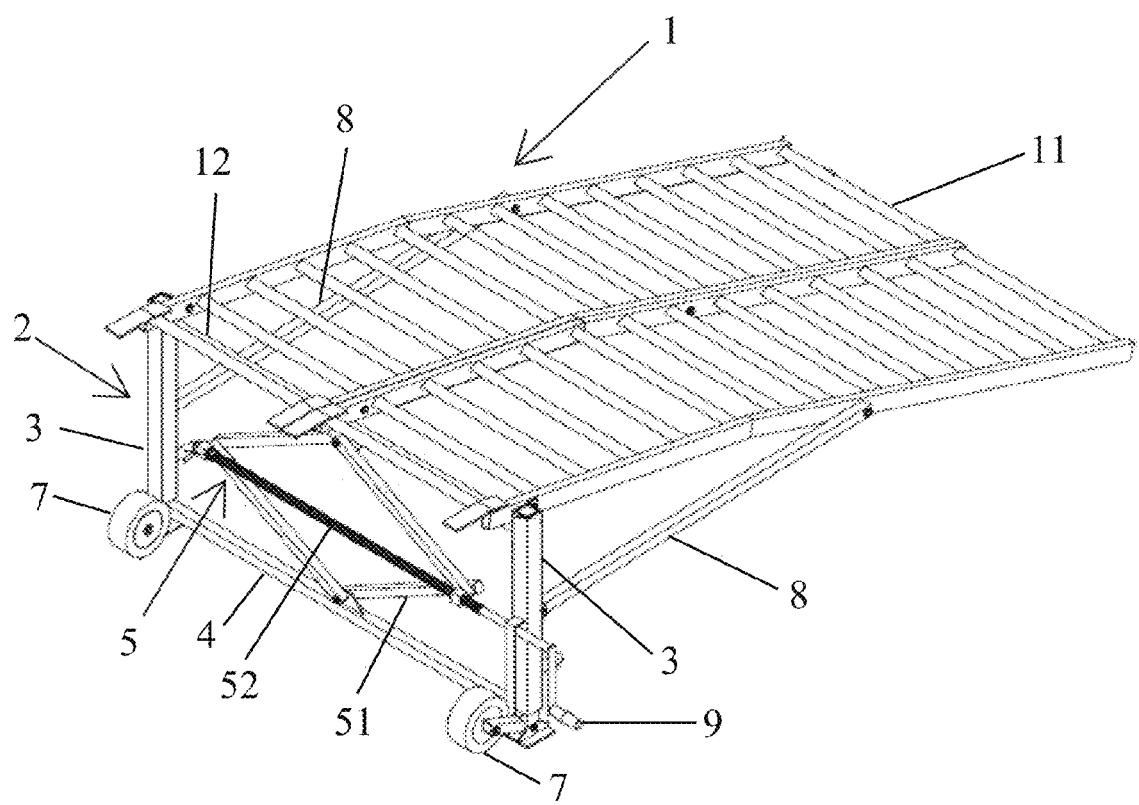
FIG. 1 is a sketch view of overall structure of a height adjustable loading ramp according to a preferred embodiment of the present invention.
Figure 2:
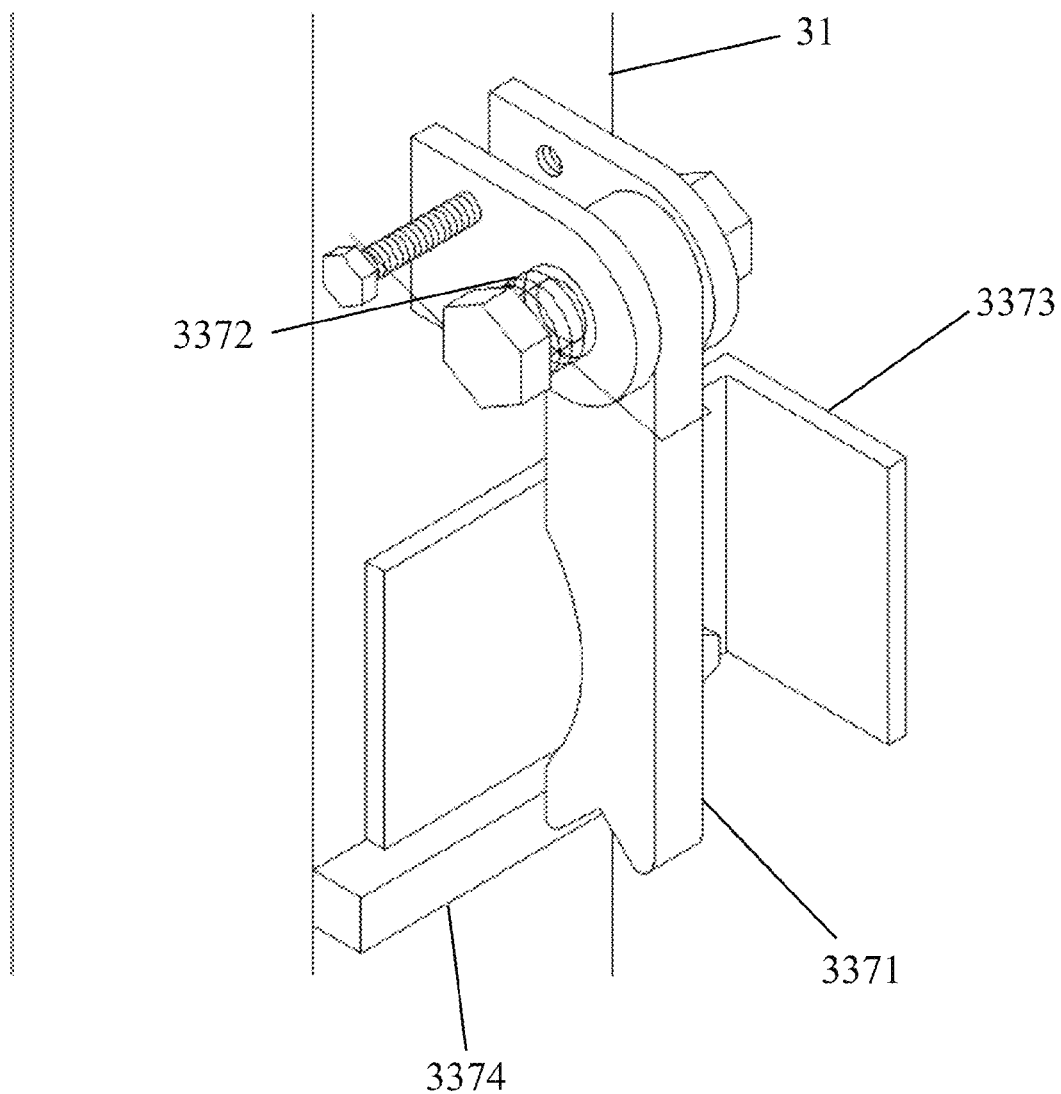
FIG. 2 is a structure sketch view of an auxiliary fixing unit in an adjusting state according to the preferred embodiment of the present invention.
Figure 3:
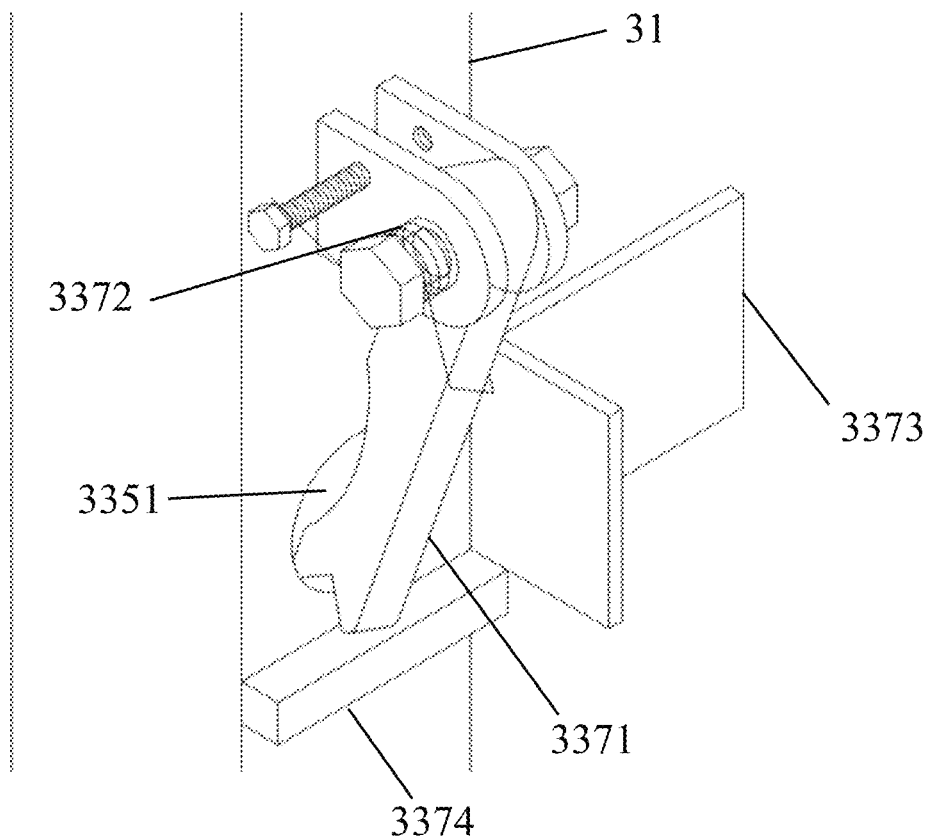
FIG. 3 is a structure sketch view of the auxiliary fixing unit in a locking state according to the preferred embodiment of the present invention.

Referring to FIG. 1, FIG. 2, FIG. 4A, FIG. 4B, and FIG. 5, the present invention provides a height adjustable loading ramp, installed at a tail of a car for loading or unloading goods, comprising:

a slope plane 1, having a first supporting edge 11 and a second supporting edge 12, wherein the first supporting edge 11 is supported on the ground; and a supporter 2, having an upper end supporting the second supporting edge 12 of the slope plane 1 to create an angle between the slope plane 1 and the ground, in such a manner that a slope is formed, wherein the supporter 2 comprises:

two supporting legs 3, wherein upper ends of the two supporting legs 3 are respectively connected with the second supporting edge 12 of the slope plane 1, each of the supporting legs comprises: an upper supporting leg 31, a lower supporting leg 32 connected with the upper supporting leg 31 movably, and an auxiliary fixing unit 33 for fixing a relative position between the upper supporting leg 31 and the lower supporting leg 32, when the supporting legs 3 supports the slope plane 1, two connecting rods 8, respectively connected between the slope plane 1 and supporting legs 3, to form two triangle supporting structures, a beam 4, provided horizontally, connected between lower portions of the two supporting legs 3, a lifting driving mechanism, for example, a scissor jack 5, wherein the scissor jack 5 comprises: four scissor jack arms 51 equal in length, wherein the four scissor jack arm 51 are in a same vertical plane, and are pivotally connected end-to-end in turn, in such a manner that the four scissor jack arms 51 define a rhomb having an invariable side length, and variable interior angles, and having an upper endpoint, a lower endpoint, a left endpoint and a right endpoint, the upper endpoint is connected with the second supporting edge 12 of the slope plane 1, the lower endpoint is connected with the beam 4 and supported on the beam 4, a connecting line between the upper endpoint and the lower endpoint is perpendicular to the beam 4, and an adjusting-locking device, comprising: a scissor jack rod 52 and a driving handle 53, wherein two end portions of the scissor jack rod 52 are respectively connected with the left endpoint and the right endpoint of the rhomb, when in an adjusting state, the driving handle 9 is turned to adjust relative positions of the left endpoint and the right endpoint on the scissor jack rod 5, in such a manner that a distance between the left endpoint and the right endpoint is changed, when the distance between the left endpoint and the right endpoint is decreased, a distance between the upper endpoint and the lower endpoint will be increased, then a height of the height adjustable loading ramp will be increased, conversely, when the distance between the left endpoint and the right endpoint is increased, the distance between the upper endpoint and the lower endpoint will be decreased, then the height of the height adjustable loading ramp will be decreased; when in a locking state, the relative positions of the left endpoint and the right endpoint on the scissor jack rod 5 is locked, then the height of the height adjustable loading ramp is locked, the scissor jack 5 supports the slope plane 1.

Figure 5:
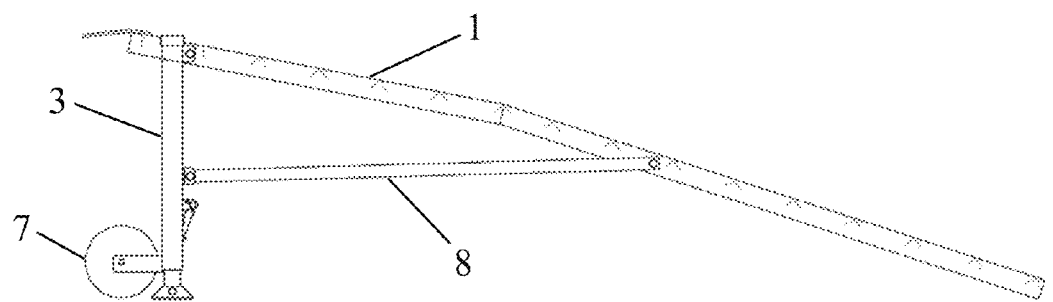
FIG. 5 is a lateral view of the height adjustable loading ramp according to the preferred embodiment of the present invention.
Figure 6:
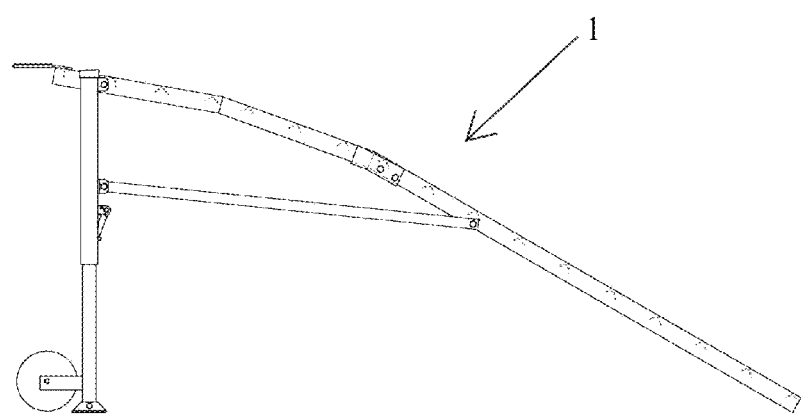
FIG. 6 is a lateral view of a height adjustable loading ramp according to another preferred embodiment of the present invention.

Referring to FIG. 1 and FIG. 5, according to the above preferred embodiment, wherein the height adjustable loading ramp further comprises a plurality of wheels 7, respectively provided at a bottom of the supporter 2, each of the wheels 7 has a proper diameter and is provided at a proper height, in such a manner that when the height adjustable loading ramp is in a working state, the wheels 7 get off the ground, when the height adjustable loading ramp is in an idle state, an angle between the supporter 2 and the ground is changed until the wheels 7 are in contact with the ground. The wheels 7 have a good load-bearing performance, therefore when the height adjustable loading ramp has a large self weight, the height adjustable loading ramp is still able to move freely via the wheels 7.

Referring to FIG. 1 and FIG. 5, wherein a first end of each connecting rod 8 is pivotally connected with the slope plane 1, a second end of each connecting rod 8 is detachably connected with the corresponding supporting leg 3, when the second end of each connecting rod 8 is disconnected from the corresponding supporting leg 3, each connecting rod 8 is able to rotate about the first end thereof to close to the slope plane 1; otherwise, the first end of each connecting rod 8 is detachably connected with the slope plane 1, the second end of each connecting rod 8 is pivotally connected with the corresponding supporting leg 3, when the first end of each connecting rod 8 is disconnected from the slope plane 1, each connecting rod 8 is able to rotate about the second end thereof to close to the corresponding supporting leg 3; the upper ends of the two supporting legs 3 are pivotally connected with the second supporting edge 12 of the slope plane 1, the upper endpoint of the scissor jack 5 is pivotally connected with the second supporting edge 12 of the slope plane 1; whereby when either end of each connecting rod 8 is disconnected from the supporting leg 3 or the slope plane 1, the slope plane 1 is able to rotate to close to the supporting leg 3 and the scissor jack 5, then the height adjustable loading ramp is able to be folded.

Referring to FIG. 1, FIG. 3, FIG. 4A and FIG. 4B, wherein the upper supporting legs 31 is sleeved outside the lower supporting legs 32, the auxiliary fixing unit is installed on the upper supporting leg 31, a supporting leg fixing hole 3351 is provided on the upper supporting leg 31, a plurality of supporting leg locating holes 3352 are provided on the lower supporting leg 32, when in the adjusting state, the supporting leg fixing hole 3351 is able to overlap anyone of the supporting leg locating holes 3352, and a supporting leg common hole is formed, when in the locking state, the auxiliary fixing unit 33 works, the auxiliary fixing unit is inserted into the supporting leg common hole for fixing the relative position between the upper supporting leg 31 and the lower supporting leg 32, in such a manner that a height of the supporting leg 3 is locked, the supporting legs 3 support the slope plane 1, the auxiliary fixing unit 33 is for extra security protection, and preventing the slope plane from falling down caused by an accidental failure of the adjusting-locking device of the scissor jack.

Referring to FIG. 2, FIG. 3, FIG. 4A and FIG. 4B, wherein the auxiliary fixing unit 33 comprises: a supporting element 3371, wherein a first end of the supporting element is rotatably connected with the upper supporting leg 31 via a torsional spring 3372, a second end of the supporting element 3371 is provided in the position of the supporting leg fixing hole 3351, for inserting into the supporting leg common hole in the locking state, in such a manner that the relative position between the upper supporting leg 31 and the lower supporting leg 32 is locked; a security door 3373, rotatably connected with the upper supporting leg 31, wherein the security door 3373 is able to rotate in a vertical plane, for covering the supporting leg fixing hole 3351 to prevent the second end of the supporting element 3371 from inserting into the supporting leg fixing hole 3351 in the adjusting state, in such a manner that the height of the supporting leg 3 is able to be adjusted conveniently; and a retainer 3374, fixedly provided on the upper supporting leg 31, for keeping the security door 3373 in a right position in the adjusting state, to eliminate an effect of the gravity on the security door.

In addition to the scissor jack device, the lifting device in the present invention could also be other types, such as machinery, hydraulic pressure, pneumatic, and motor-driven.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A height adjustable loading ramp installed at a tail of a car for loading or unloading goods, comprising:
   a slope plane, having a first supporting edge and a second supporting edge, wherein said first supporting edge is supported on the ground; and
   a supporter, an upper end of which supports said second supporting edge of said slope plane, in such a manner that an angle is created between said slope plane and the ground, and a slope is formed, wherein said supporter comprises:
   two supporting legs, wherein upper ends of said two supporting legs are respectively connected with said second supporting edge, each of said supporting legs comprises: an upper supporting leg, a lower supporting leg connected with said upper supporting leg movably, and an auxiliary fixing unit for fixing a relative position between said upper supporting leg and said lower supporting leg, when said supporting legs support said slope plane,
   two connecting rods, respectively connected between said slope plane and said supporting legs to form two triangle supporting structures,
   a beam, provided horizontally and connected between lower portions of said two supporting legs,
   a lifting driving structure, comprising a scissor jack, wherein said scissor jack comprises: four scissor jack arms equal in length, said four scissor jack arms are in a same vertical plane, and are pivotally connected end-to-end in turn, in such a manner that said four scissor jack arms define a rhomb having an invariable side length, and variable interior angles, and having an upper endpoint, a lower endpoint, a left endpoint and a right endpoint, said upper endpoint is connected with said second supporting edge of said slope plane, said lower endpoint is connected with said beam and supported on said beam, a connecting line between said upper endpoint and said lower endpoint is perpendicular to said beam, and
   an adjusting-locking device, comprising: a driving handle and a scissor jack rod, wherein said left endpoint and said right endpoint of said rhomb are screwed onto said scissor jack rod, and one end of said scissor jack rod is connected with said driving handle, in such a manner that when cranking said driving handle, a distance between said left endpoint and said right endpoint is changed, and a distance between said upper endpoint and said lower endpoint of said rhomb is changed accordingly for adjusting a height of said height adjustable loading ramp; when stopping cranking said driving handle, said scissor jack rod with threads has a self-locking function to keep said left endpoint and said right endpoint on said scissor jack rod in position, so that said height of said height adjustable loading ramp is locked accordingly.

2. The height adjustable loading ramp, as recited in claim 1, further comprising a plurality of wheels, respectively provided at a bottom of said supporter, wherein when said height adjustable loading ramp is in a working state, said wheels are off the ground; when said height adjustable loading ramp is in an idle state, said first supporting edge of said slope plane is lifted off the ground, and said wheels are in contact with the ground for moving said height adjustable loading ramp to a desired place easily.

3. The height adjustable loading ramp, as recited in claim 1, wherein a first end of each connecting rod is pivotally connected with said slope plane, a second end of each connecting rod is detachably connected with said corresponding supporting leg, when said second end of each connecting rod is disconnected from said corresponding supporting leg, each connecting rod is able to rotate about said first end thereof to close to said slope plane; otherwise, said first end of each connecting rod is detachably connected with said slope plane, said second end of each connecting rod is pivotally connected with said corresponding supporting leg, when said first end of each connecting rod is disconnected from said slope plane, each connecting rod is able to rotate about said second end thereof to close to said corresponding supporting leg; said upper ends of said two supporting legs are pivotally connected with said second supporting edge of said slope plane, said upper endpoint of said scissor jack is pivotally connected with said second supporting edge of said slope plane; whereby when either end of each connecting rod is disconnected from said corresponding supporting leg or said slope plane, said slope plane is able to be rotated to close said corresponding supporting leg and said scissor jack, so as to fold said height adjustable loading ramp.

4. The height adjustable loading ramp, as recited in claim 1, wherein said upper supporting legs are sleeved outside said lower supporting legs, said auxiliary fixing unit is installed on said upper supporting leg, a supporting leg fixing hole is provided on said upper supporting leg, a plurality of supporting leg locating holes are provided on said lower supporting leg, when in said adjusting state, said supporting leg fixing hole is able to overlap anyone of said supporting leg locating holes, and a supporting leg common hole is formed, when in said locking state, said auxiliary fixing unit works, said auxiliary fixing unit is inserted into said supporting leg common hole for fixing said relative position between said upper supporting leg and said lower supporting leg, in such a manner that a height of said supporting leg is locked, said supporting legs support said slope plane.

5. The height adjustable loading ramp, as recited in claim 4, wherein said auxiliary fixing unit comprises:
   a supporting element, wherein a first end of said supporting element is rotatably connected with said upper supporting leg via a torsional spring, a second end of said supporting element is provided in a position of said supporting leg fixing hole, for inserting into said supporting leg common hole in said locking state, in such a manner that said relative position between said upper supporting leg and said lower supporting leg is locked;

a security door, rotatably connected with said upper supporting leg, wherein said security door is able to rotate in a vertical plane, for covering said supporting leg fixing hole to prevent said second end of said supporting element from inserting into said supporting leg fixing hole in said adjusting state, in such a manner that said height of said supporting leg is able to be adjusted conveniently; and a retainer, fixedly provided on said upper supporting leg, for keeping said security door in a right position in said adjusting state, to eliminate an effect of the gravity on said security door.

* * * * *